(12) United States Patent
Natanzon et al.

(10) Patent No.: US 9,798,472 B1
(45) Date of Patent: Oct. 24, 2017

(54) EXTENT LEVEL CACHE DESTAGING

(71) Applicant: EMC Corporation, Hopkinton, MA (US)

(72) Inventors: Assaf Natanzon, Tel Aviv (IL); Eitan Bachmat, Lehavim (IL); Mark Abashkin, Erez (IL)

(73) Assignee: EMC CORPORATION, Hopkinton, MA (US)

( * ) Notice: Subject to any disclaimer, the term of this patent is extended or adjusted under 35 U.S.C. 154(b) by 0 days.

(21) Appl. No.: 14/868,690

(22) Filed: Sep. 29, 2015

(51) Int. Cl.
*G06F 12/00* (2006.01)
*G06F 3/06* (2006.01)
*G06F 12/128* (2016.01)

(52) U.S. Cl.
CPC ............ *G06F 3/061* (2013.01); *G06F 3/0619* (2013.01); *G06F 3/0655* (2013.01); *G06F 3/0665* (2013.01); *G06F 3/0688* (2013.01); *G06F 12/128* (2013.01); *G06F 2212/69* (2013.01)

(58) Field of Classification Search
CPC .. G06F 12/00; G06F 12/0238; G06F 12/0246; G06F 12/0253
USPC .......... 711/100, 103, 154, 200, 118
See application file for complete search history.

(56) References Cited

U.S. PATENT DOCUMENTS

| | | | | |
|---|---|---|---|---|
| 7,577,787 | B1 * | 8/2009 | Yochai | G06F 12/0804 711/113 |
| 2006/0184740 | A1 * | 8/2006 | Ishikawa | G06F 12/084 711/129 |
| 2010/0262777 | A1 * | 10/2010 | Kaga | G06F 3/0608 711/118 |
| 2011/0047344 | A1 * | 2/2011 | Eguchi | G06F 3/0605 711/171 |
| 2011/0258391 | A1 * | 10/2011 | Atkisson | G06F 11/108 711/118 |

* cited by examiner

*Primary Examiner* — Tuan Thai
(74) *Attorney, Agent, or Firm* — Konrad R. Lee; Krishnendu Gupta

(57) ABSTRACT

A System, Computer Program Product, and Computer-executable method for managing cache de-staging on a data storage system wherein the data storage system provides a Logical Unit (LU), the System, Computer Program Product, and Computer-executable method including dividing the LU into two or more extents, analyzing each of the two or more extents, creating a cache de-staging policy based on the analysis, and managing cache de-staging of the LU based the cache de-staging policy.

14 Claims, 9 Drawing Sheets

EXTENT LEVEL CACHE DESTAGING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A System, Computer Program Product, and Computer-executable method for managing cache de-staging on a data storage system wherein the data storage system provides a Logical Unit (LU), the System, Computer Program Product, and Computer-executable method including dividing the LU into two or more extents, analyzing each of the two or more extents, creating a cache de-staging policy based on the analysis, and managing cache de-staging of the LU based the cache de-staging policy.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
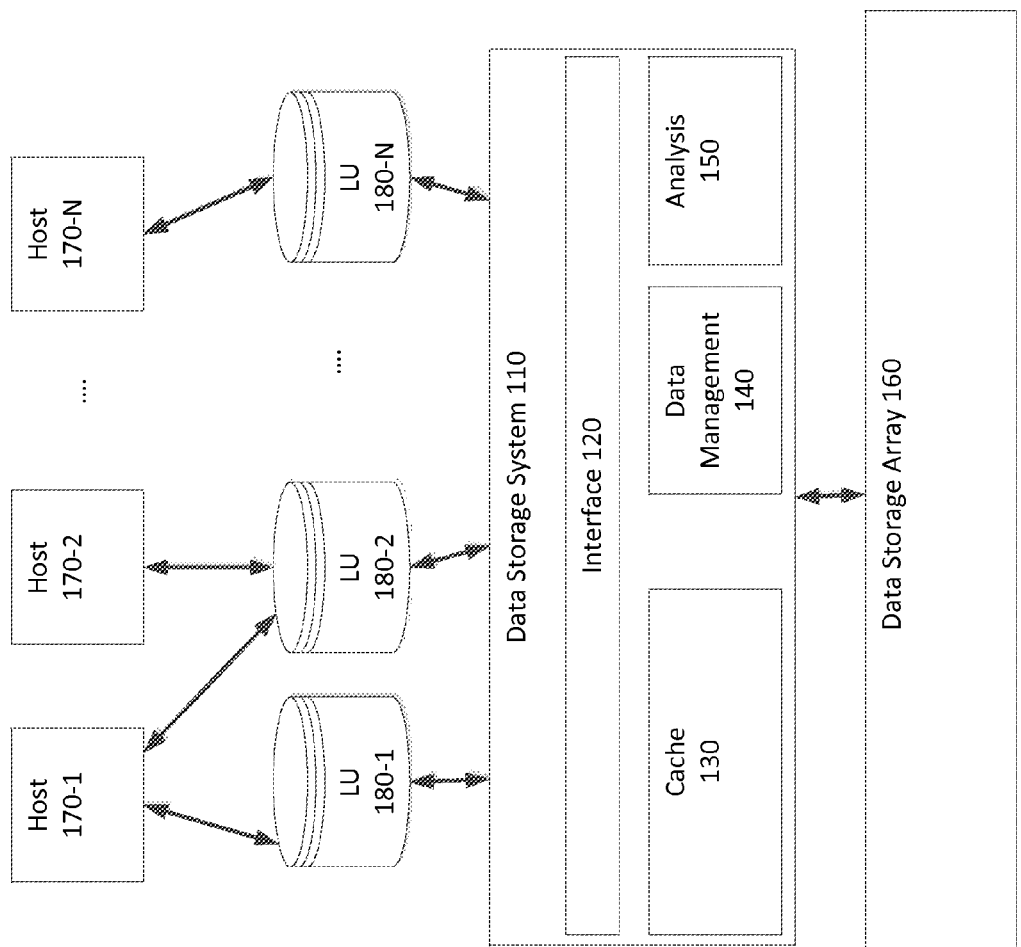
FIG. 1 is a simplified illustration of a data storage system providing data storage to a plurality of hosts, in accordance with an embodiment of the present disclosure.

Traditionally, data storage systems utilize cache and data storage to provide data storage services to users. Typically, data storage systems cache incoming I/Os and periodically de-stage the data to data storage. Generally, a data storage system holds on to data in cache and de-stages sequential portions of data to data storage. Conventionally, improvements to cache de-staging would be beneficial to the data storage industry.

Extent Level Cache De-staging

In many embodiments, the current disclosure may enable a data storage system to optimize de-staging of data I/Os from cache to data storage. In certain embodiments, the current disclosure may enable a data storage system to manage de-staging from cache based on what type and/or types of data storage arrays may be in communication with the data storage system. In various embodiments, the current disclosure may enable a data storage system to optimize de-staging to Flash data storage arrays, rotational disk data storage arrays, and/or hybrid data storage arrays. In certain embodiments, a data storage system may be in communication with a bank of data storage devices. In these embodiments, a data storage system may be enabled to de-stage data from cache to one or more data storage devices. In most embodiments, a data storage device may include a flash data storage device, rotational disk data storage device, Non-volatile memory data storage device, and/or other recognized device enabled to store data.

In many embodiments, a data storage system may include a data management module, an analysis module, and/or cache. In most embodiments, a cache may be comprised of flash storage and/or other non-volatile memory. In various embodiments, a data management module may be enabled to manage transfer of data I/Os between cache and one or more data storage arrays. In some embodiments, a data management module may enable a data storage system to provide one or more Logical Units (LUs) to one or more users and/or hosts. In certain embodiments, a data management module may be enabled to divide each LU into one or more extents. In various embodiments, an extent may be 100 MegaBytes (MB). In other embodiments, a data management module may be enabled to configure the size of each extent.

In certain embodiments, an analysis module may be enabled to analyze data I/Os in cache and/or cache activity to determine which portions of cache to de-stage to one or more data storage arrays. In various embodiments, an analysis module may be enabled to analyze data I/Os in cache and/or cache activity to determine when to de-stage one or more portions of cache to one or more data storage arrays.

In most embodiments, a data management module may be enabled to create a LU from one or more data storage arrays in communication with a data storage system. In various embodiments, a data management module may be enabled to provide the LU for use by one or more users and/or hosts. In certain embodiments, a data management module may be enabled to divide a LU into two or more extents. In some embodiments, a data management module may be enabled to configure each extent individually. In other embodiments, a data management module may be enabled to configure each extent as a group of extents, where each extent may be configured to be the same or of similar size as each extent created from the LU.

In many embodiments, an analysis module may be enabled to analyze one or more properties of a LU and/or an extent. In various embodiments, an analysis module may be enabled to calculate a probability of write folding within each extent. In certain embodiments, write folding may be the action of overwriting memory and/or data storage at least one time. In some embodiments, write folding may describe how one or more portions of memory and/or data storage may be overwritten over a time period. In most embodiments, an analysis module may be enabled to determine a write folding ratio.

In various embodiments, a write folding ratio may be the amount of data storage and/or memory write folded as compared to a total amount of data storage and/or memory within an extent, LU, and/or other data storage provided to a host. In certain embodiments, an analysis module may be enabled to compare write folding ratios of two or more portions of data storage. In some embodiments, write folding may include the amount of data written to storage divided by the amount of total unique addresses for which the data was written (i.e. the average time a data piece was written to each location in the portion). In most embodiments, an analysis module may analyze write folding ratios of each extent from a LU provided by a data storage system. In various embodiments, an analysis module may order each extent by write folding ratio. In certain embodiments, an analysis module may be enabled to determine whether one or more extents may have a high and/or very high probability for write folding within a future period of time.

In many embodiments, an extent having a write folding ratio within the top 10% of write folding ratios of extents from a LU may have a probability of almost 100% of write folding within a specified time. In certain embodiments, a probability of almost 100% of write folding may mean that each location in an extent may be written at least two times within a specified time. In various embodiments, a specified time may be five minutes. In some embodiments, an analysis module may be enabled to determine a specified time in which there may be almost 100% probability of write folding. In most embodiments, write folding may include a situation where each location may be overwritten at least twice within the specified time and in many cases even more than twice. In certain embodiments, an analysis module may be enabled to determine when an extent may have a high probability of write folding. In other embodiments, an analysis module may be enabled to determine when an extent may have a low probability of write folding. In some embodiments, an analysis module may be enabled to determine when an extent may have a low probability of write folding based on a write folding ratio. In various embodiments, an analysis module may be enabled to provide information to a data management module as to which portions of data should be kept in cache and which portions of data should be de-staged.

In most embodiments, an analysis module may be enabled to augment analysis and data storage and/or cache use based on what type of data storage arrays are used in combination with the data storage system. In various embodiments, an analysis module may be enabled to augment de-staging policy based on what type of data storage arrays are used in combination with the data storage system. In some embodiments, an analysis module may be enabled to augment a de-staging policy based on one or more behaviors perceived by the analysis module. For example, in various embodiments, data may be written in a heavily sequential manner to some extents. In other embodiments, data may be written in heavily defragmented manner to other extents. In some embodiments, an amount, ratio, and/or percentage of sequentialness and/or defragmentation may affect the creation of a de-staging policy. In many embodiments, when a data storage system may be utilizing a flash data storage array, an analysis module may provide a de-staging policy to the data management module that prioritizes de-staging extents which may have a low probability of write folding while keeping data from extents with high write folding probabilities for longer periods of time before de-staging. In various embodiments, postponing cache de-staging for extents with high write folding probabilities may reduce the number of writes that need to be de-staged. In most embodiments, limiting the number of writes may be important as flash based data storage arrays may only be enabled to perform a finite/limited number of write commands due to wearing.

In certain embodiments, an analysis module may be enabled to provide a cache de-staging policy for data storage systems used in combination with rotational disk data storage arrays. In various embodiments, an analysis module may be enabled to determine whether one or more extents contain sequential writes of data I/Os. In most embodiments, an analysis module is enabled to analyze patterns of reading from and/or writing to an extent to determine whether an extent behaves mostly sequentially. In various embodiments, when an extent contains mostly sequential data and may be anticipated to include sequential data in the future, waiting to de-stage the data may benefit rotational disk storage. In certain embodiments, an analysis module may recommend that an extent postpone de-staging data and/or data I/Os until enough sequential data may be contained within the extent. In some embodiments, enough sequential data may include, but is not limited to, more than half full, greater than 80 percent full, and/or any other specified percentage.

In some embodiments, when a data storage system is used in combination with rotation disk data storage arrays, an analysis module may be enabled to provide a cache de-staging policy that prioritizes data I/O characteristics beneficial to rotational disk storage. In most embodiments, data I/O characteristics beneficial to rotational disk storage may include low write folding probabilities with sequential data I/Os.

Refer to the example embodiment of FIG. 1. FIG. 1 is a simplified illustration of a data storage system providing data storage to a plurality of hosts, in accordance with an embodiment of the present disclosure. Data storage system 110 is in communication with data storage array 160. Data storage array 160 may represent one or many data storage arrays. Data storage array 160 may include one or more flash data storage arrays. Data storage array 160 may include one or more rotational disk data storage arrays. Data storage array 160 may represent a plurality of data storage arrays that may be a combination of flash and rotational disk data storage arrays. In this embodiment, data storage system 110 includes interface 120, cache 130, data management module 140, and analysis module 150. Data storage system 110 is enabled to provide Logical Units (LU) (180-1 . . . N, 180 Generally) to hosts (170-1 . . . N, 170 Generally). In many embodiments, a host may be enabled to access one or more LU's provided by a data storage system. In various embodiments, a data storage system may be enabled to provide one or more LUs from one or more data storage arrays in communication with the data storage system.

In this embodiment, data storage system 110 is enabled to provide LUs 180 to hosts 170 using storage within data storage array 160. Data storage system 110 is enabled to cache incoming data I/Os from hosts 170 within cache 130. Data storage system 110 is enabled to move data I/Os from cache 130 to portions of data storage array 160 that represent LUs 180. Analysis module 150 is enabled to analyze data I/Os stored on cache 130 to determine whether data management module 140 should retain data I/Os in cache or de-stage data I/Os to data storage array 160. Analysis module 150 is enabled to create one or more policies based on data I/Os received by the data storage system from hosts 170. Data management module 140 is enabled to manage data I/Os stored on cache 130 based on one or more policies from analysis module 150. In many embodiments, a data management module may be enabled to manage retention and/or de-staging of data I/O stored on cache based on one or more policies.

Figure 2:
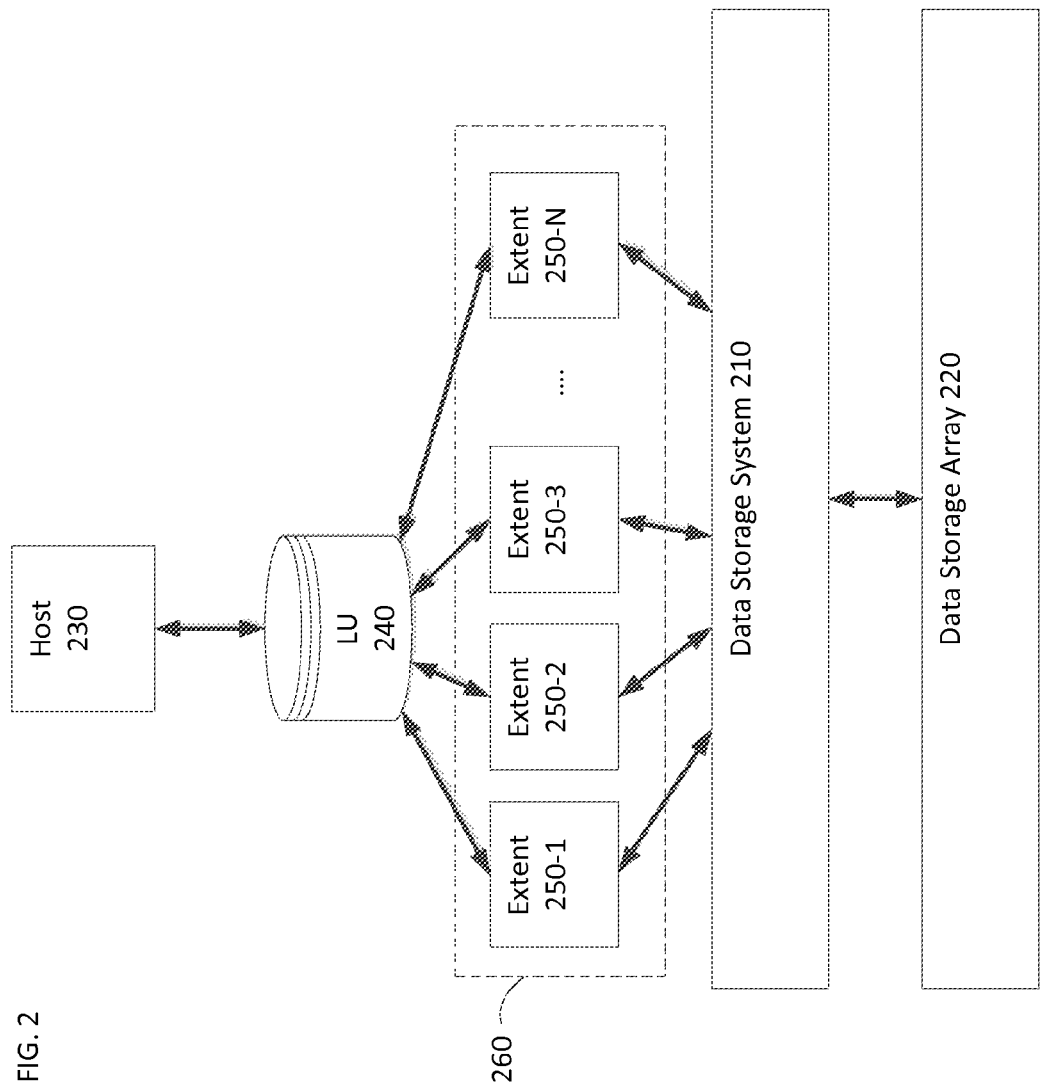
FIG. 2 is a simplified illustration of a data storage system providing data storage to a host, in accordance with an embodiment of the present disclosure.

Refer to the example embodiment of FIG. 2. FIG. 2 is a simplified illustration of a data storage system providing data storage to a host, in accordance with an embodiment of the present disclosure. As shown, data storage system 210 is in communication with data storage array 220. Data storage system 210 is providing LU 240 to host 230. In this embodiment, objects shown within box 260 show how data storage system 210 manages LU 240. Data storage system 210 is enabled to cache data I/Os received from host 230 directed towards LU 240. LU 240 is provided by data storage system 210 using data storage from data storage array 220. Data storage system 210 is enabled to divide LU 240 into Extents (250-1 . . . N, 250 Generally). Data storage system 210 is enabled to cache data I/Os from host 230 for LU 240. Data storage system 210 is enable to expedite and/or delay destaging of data I/Os from cache to data storage array 220 based on analysis of data I/Os from host 230. Data storage system 210 is enabled to map each of Extents 250 to a portion of cache. Data storage system 210 is enabled to analyze each of the extents 250 individually to determine whether data storage system 210 should retain and/or de-stage cached data I/Os to data storage array 220.

Figure 3:
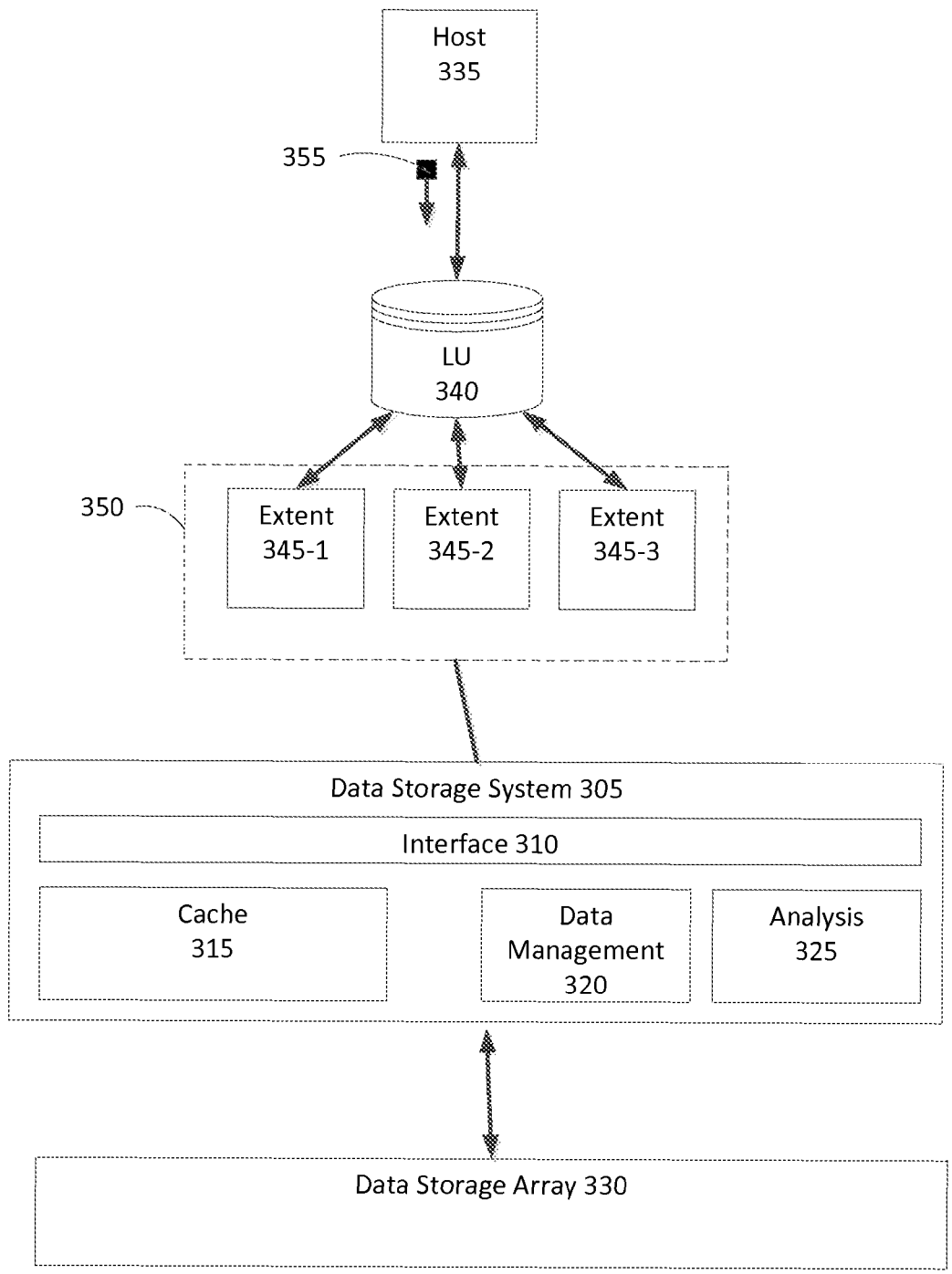
FIG. 3 is a simplified illustration of a host utilizing data storage provided by a data storage system, in accordance with an embodiment of the present disclosure.

Refer to the example embodiment of FIG. 3. FIG. 3 is a simplified illustration of a host utilizing data storage provided by a data storage system, in accordance with an embodiment of the present disclosure. Data storage system 305 is in communication with data storage array 330. Data storage system 305 includes interface 310, cache 315, data management module 320, and analysis module 325. Data storage system 305 provides LU 340 for host 335. Data storage system 305 is enabled to provide LU 340 using data storage array 330 and cache 315. Objects shown within box 350 illustrate how data storage system 305 manages LU 340. Data storage system 305 is enabled to divide LU 340 into Extents (345-1 . . . 3, 345 Generally). In many embodiments, each extent may be of the same size. In various embodiments, each extent may be of variably configured size. Each of Extents 345 is enabled to be directly mapped to data storage array 330 as LU 340 is provided from data storage available on data storage array 330. Data storage system 305 is enabled to map a portion of cache 315 for each of extents 345.

In this embodiment, data storage system 305 is enabled to cache data I/Os received from host 335 to enable faster data storage performance between host 335 and LU 340. Data storage system 305 is enabled to direct analysis module 325 to analyze caching of data I/Os to each of extents 345 individually. In this embodiment, host 335 is enabled to send data I/Os to LU 340 using message 355. In most embodiments, the message from a host to an LU may be a SCSI command. Data storage system 305 is enabled to receive message 355 and is enabled to store the associated data I/O within a portion of cache 315 associated with LU 340 and one of extents 345. Analysis module 325 is enabled to analyze received data I/Os stored in cache 315. In this embodiment, analysis module 325 is enabled to provide one or more policies to data storage system 305 based on analysis from analysis module 325. Data storage system 305 is enabled to utilize the one or more policies to manage data I/Os stored within cache 315 using data management module 320.

In many embodiments, an analysis module may be enabled to analyze the probability of write folding which may occur for data cached from one or more extents representing one or more LUs providing by a data storage system. In other embodiments, an analysis module may be enabled to analyze whether or not received data I/Os may have been written to cache sequentially. In most embodiments, an analysis module may be enabled to analyze the probability that future I/Os may continue to arrive sequentially. In various embodiments, an analysis module may be enabled to create one or more policies to the data storage system based on the analysis of extents and/or received data I/Os. In certain embodiments, one or more policies may enable a data management module to retain and/or de-stage cache to improve efficiency of a data storage system. In most embodiments, improved efficiency may include faster read and/or write times.

Figure 4:
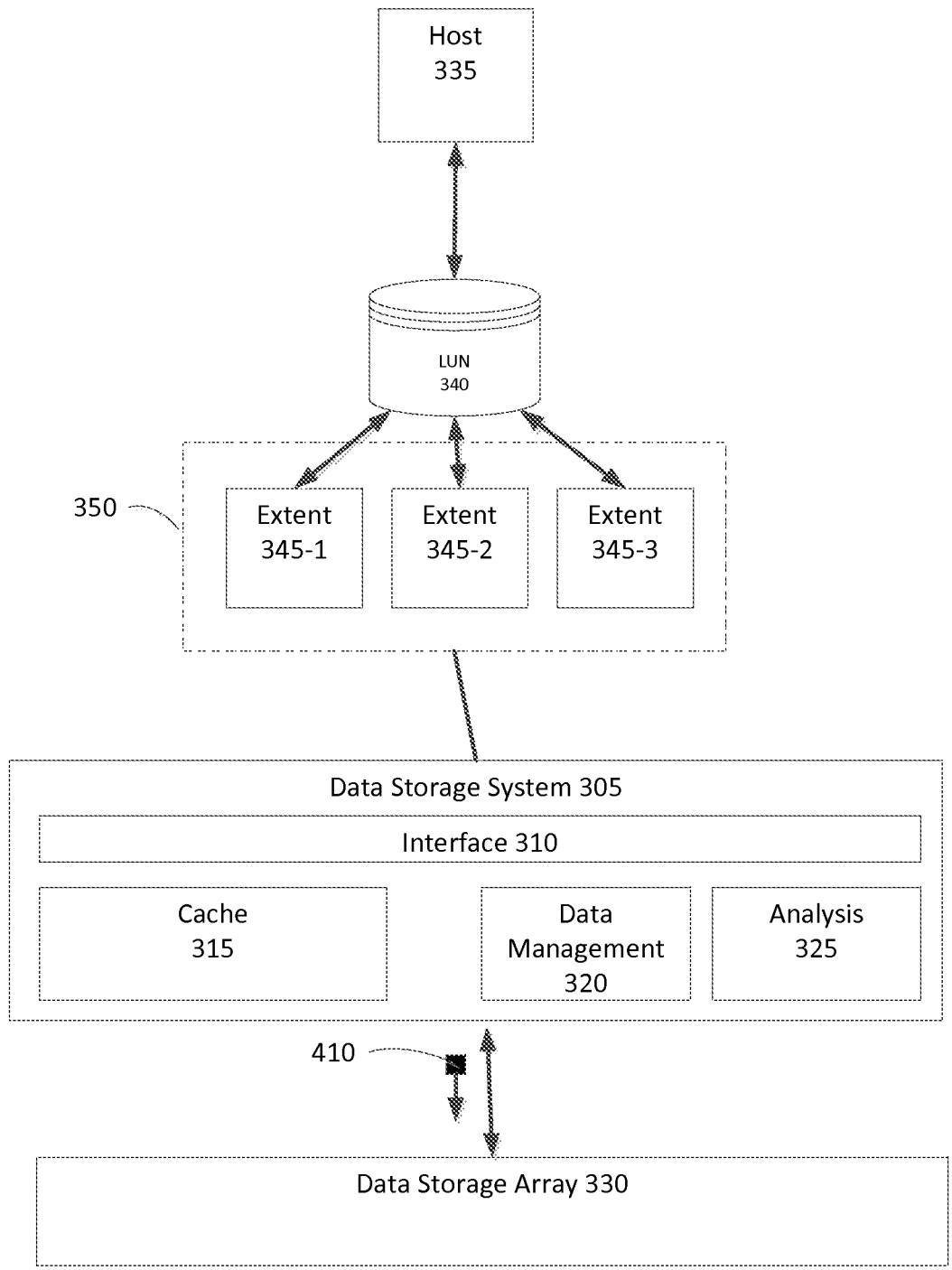
FIG. 4 is a simplified illustration of a host utilizing data storage provided by a data storage system, in accordance with an embodiment of the present disclosure.

Refer to the example embodiment of FIG. 4. FIG. 4 is a simplified illustration of a host utilizing data storage provided by a data storage system, in accordance with an embodiment of the present disclosure. Data storage system 305 is in communication with data storage array 330. Data storage system 305 includes interface 310, cache 315, data management module 320, and analysis module 325. Data storage system 305 provides LU 340 for host 335. In this embodiment, Data storage system 305 is enabled to de-stage data I/Os, using message 410, to data storage array 330. In various embodiments, a data management module may be enabled to move data and/or data I/Os between data storage system 305 and data storage array 330 on an as needed basis.

Figure 5:
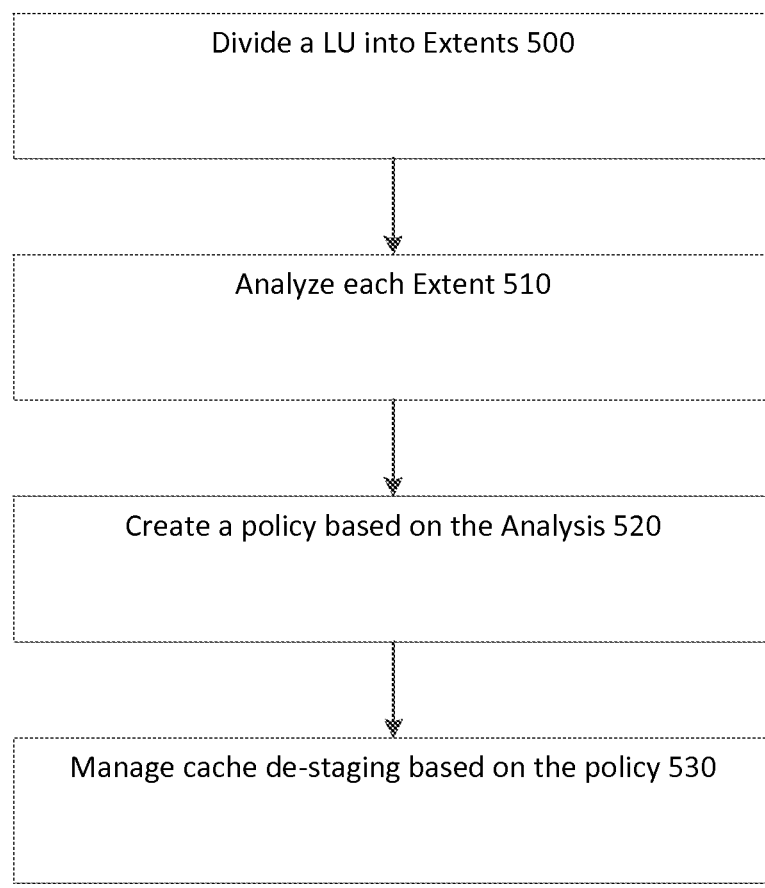
FIG. 5 is a simplified flowchart of a method of managing de-staging of cache in the data storage system shown in FIG. 3, in accordance with an embodiment of the present disclosure.

Refer to the example embodiments of FIGS. 3 and 5. FIG. 5 is a simplified flowchart of a method of managing de-staging of cache in the data storage system shown in FIG. 3, in accordance with an embodiment of the present disclosure. FIG. 3 shows Data storage system 305 is in communication with data storage array 330. Data storage system 305 includes interface 310, cache 315, data management module 320, and analysis module 325. Data storage system 305 provides LU 340 for host 335. Data storage system 305 divides LU 340 into Extent 345-1, extent 345-2, and extent 345-3 (Step 500). Each portion of data and/or data I/O stored by host 335 on LU 340 is stored on one of extents 345. Data storage system 305 caches received data I/Os within cache 315 before eventually de-staging received data I/Os to data storage array 330. Data storage system 305 directs analysis module 325 to analyze portions of cache 315 associated with each of extents 345 (Step 510). Based on the analysis, Analysis module 325 creates one or more policies to direct how data storage system 305 will manage received data I/Os associated with each of extents 345 (Step 520). Data storage system 305 utilizes data management module 320 to manage cache de-staging base on the one or more policies created by the analysis module (Step 530). In many embodiments, a policy may direct a data management module to retain data and/or data I/Os within cache. In other embodiments, a policy may direct a data management module to de-stage data and/or data I/Os to one or more data storage arrays.

In most embodiments, a decision to retain and/or de-stage cache may be related to the probability that a portion of cache associated with an extent may have been write folded. In certain embodiments, a higher probability of write folding may signify that a portion of cache may be encounter write folding in the near future. In various embodiments, a lower probability of write folding may signify that a portion of cache may not have a heavy amount of write folding in the future. In some embodiments, an analysis module may optimize a cache de-staging policy to de-stage data and/or data I/Os that may have a lower probability of write folding. In certain embodiments, an analysis module may optimize a cache de-staging policy to retain data and/or data I/Os that may have a higher probability of write folding.

Figure 6:
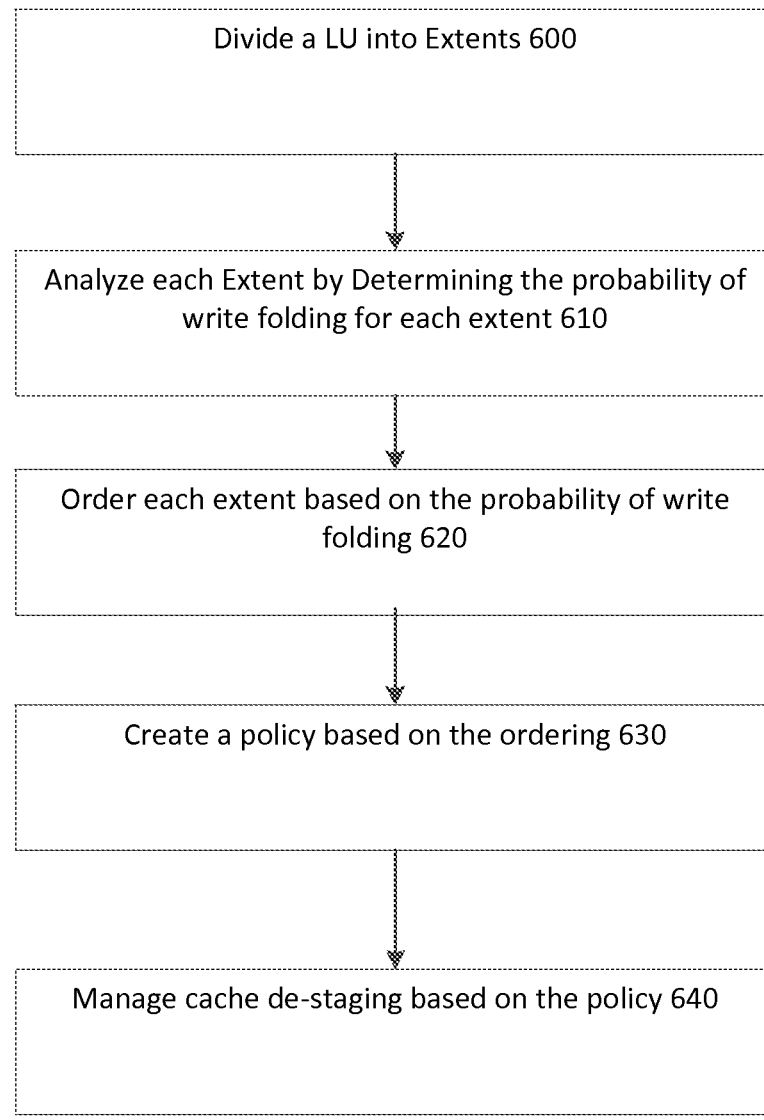
FIG. 6 is an alternate simplified flowchart of a method of managing de-staging of cache in the data storage system shown in FIG. 3, in accordance with an embodiment of the present disclosure.

Referring to the example embodiments of FIGS. 3 and 6. FIG. 6 is an alternate simplified flowchart of a method of managing de-staging of cache in the data storage system shown in FIG. 3, in accordance with an embodiment of the present disclosure. FIG. 3 shows Data storage system 305 is in communication with data storage array 330. Data storage system 305 includes interface 310, cache 315, data management module 320, and analysis module 325. Data storage system 305 divides LU 340 into Extent 345-1, extent 345-2, and extent 345-3 (Step 600). Data storage system 305 directs analysis module 325 to analyze caching data and/or data I/Os stored in each of Extents 345 to determine the probability or the amount of write folding for each of extents 345 (Step 610). Analysis module 325 orders usage of cache 315 based on the amount or probability of write folding (Step 620). Analysis module 325 creates a policy based on the ordering (Step 630). Data storage system 305 manages cache de-staging based on the policy (Step 640).

In this embodiment, Data Storage system 305 retains data and/or data I/Os stored within cache 315 that the policy designates as have a high probability and/or a high amount of write folding. Analysis module 325 determines that Extent 345-1 has a high probability and/or a high amount of write folding, Extent 345-2 has a medium probability of write folding, and Extent 345-3 has a low probability of write folding. The policy created by analysis module 325 directs data storage system 305 to retain data and/or data I/Os within Extent 345-1 within cache 315 as it is likely that more write folding will occur in extent 345-1. The policy directs data storage system 305 to de-stage cache data and/or data I/Os related to Extent 345-3 as Extent 345-3 is not likely to incur frequent write folding.

Figure 7:
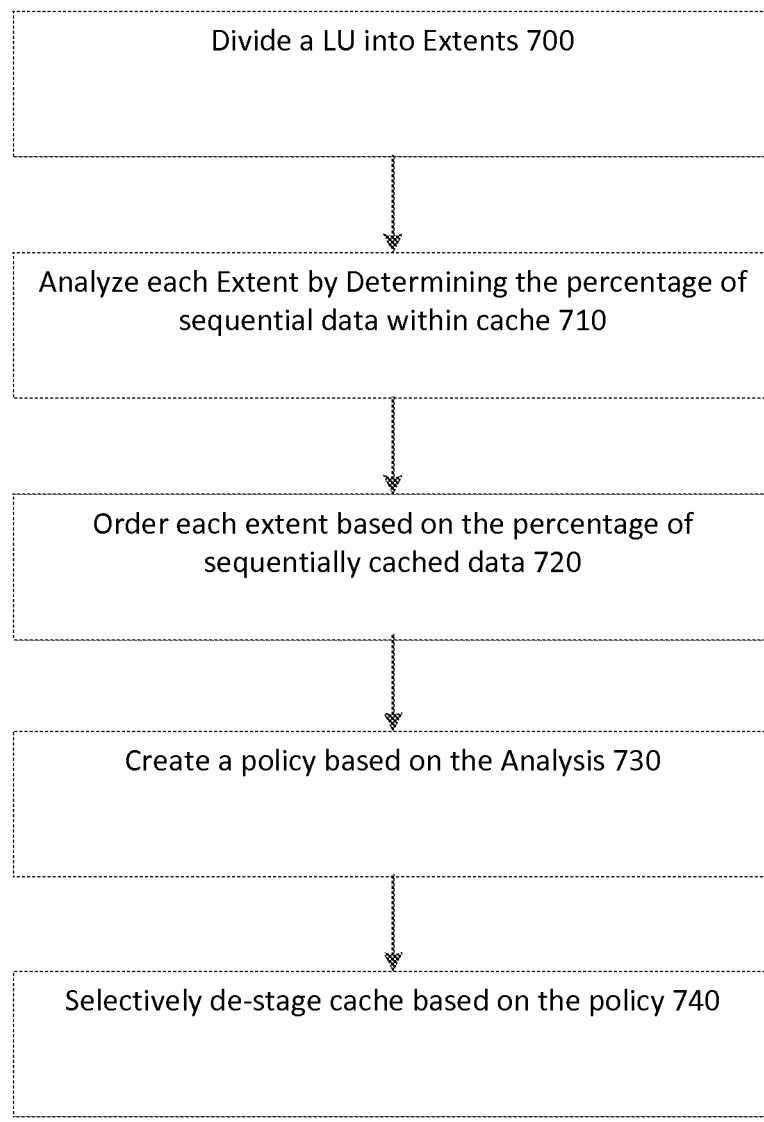
FIG. 7 is a further alternative simplified flowchart of a method of managing de-staging of cache within the data storage system shown in FIG. 4, in accordance with an embodiment of the present disclosure.

Refer to the example embodiments of FIGS. 4 and 7. FIG. 7 is a further alternative simplified flowchart of a method of managing de-staging of cache within the data storage system shown in FIG. 4, in accordance with an embodiment of the present disclosure. FIG. 4 shows Data storage system 305 is in communication with data storage array 330. Data storage system 305 includes interface 310, cache 315, data management module 320, and analysis module 325. Data storage system 305 divides LU 340 into Extents (345-1 . . . 3, 345 Generally) (Step 700). Data storage system 305 directs analysis module 325 to analyze each of extents 345 by determining the percentage of sequential data and/or data I/Os stored within cache 315 and associated with one of extents 345 (Step 710). Analysis module 325 orders each of extents 345 based on the percentage of sequentially stored data and/or data I/Os within cache 315 (Step 720). Analysis module 325 creates a policy based on the analysis (step 730). Data storage system 305 selectively de-stages data and/or data I/Os within cache 315, associated with at least one of extents 345, based on the created policy (Step 740). In this embodiment, sequential data is destaged when a large enough portion of data is written to one of extents 345. Specifically, writing large portions of data is important for rotational disk storage as rotational disks perform significantly better when writing sequential IOs rather than random IOs.

In this embodiment, analysis module 325 has determined that data and/or data I/Os written to Extent 345-1 and Extent 345-2 are cached in cache 315. Analysis module 325 has determined that data and/or data I/Os cached in cache 315 have been written to cache 315 sequentially. Further, data and/or data I/Os written to Extent 345-1 and Extent 345-2 in the past indicate to analysis module 325 that future data and/or data I/Os will continue to be written sequentially. The policy that analysis module 325 creates directs data storage system 305 to de-stage portions of cache 315 that is primarily sequentially stored. In this embodiment, data storage system 305 directs data management module 320 to de-stage data and/or data I/Os stored within cache 315, and associated with Extent 345-1 and Extent 345-2, to data storage array 330 using message 410.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
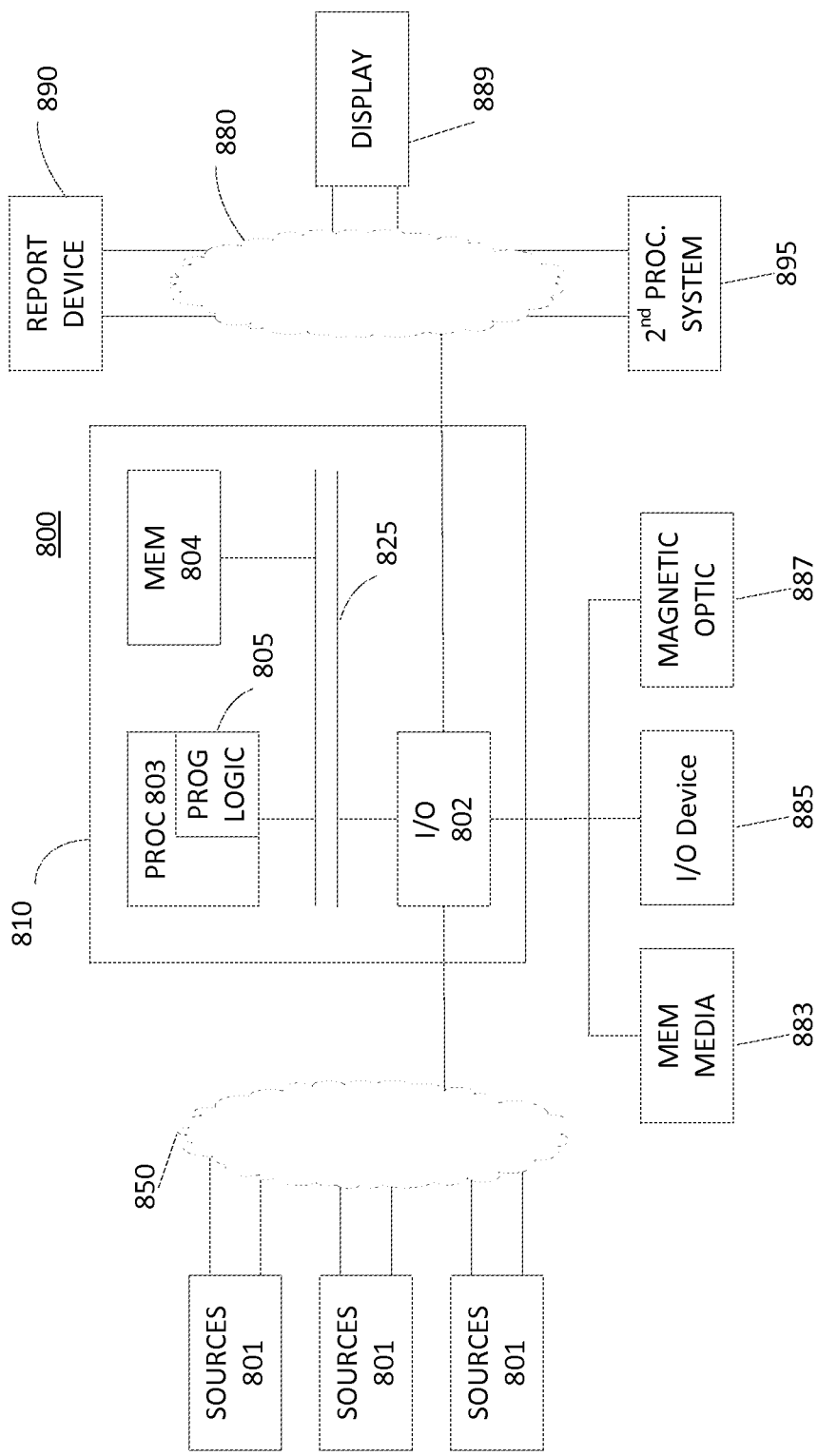
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic drives, optical drives, or Solid State Drives (SSD). When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
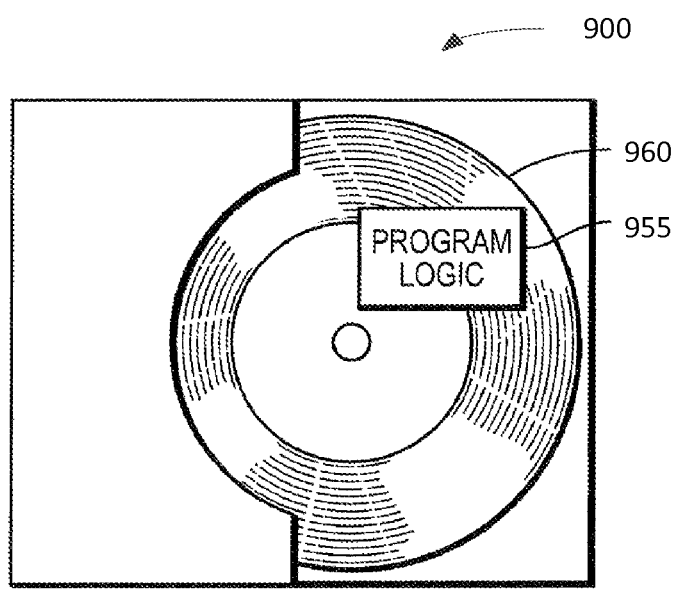
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A Computer-executable method for managing cache de-staging on a data storage system wherein the data storage system provides a Logical Unit (LU), the computer-executable method comprising:
   dividing, by the data storage system, the LU into two or more extents;
   at the data storage system, analyzing each of the two or more extents;
   creating, via the data storage system, a cache de-staging policy based on the analysis; and
   managing, at the data storage system, cache de-staging of the LU based the cache de-staging policy;
   wherein the analyzing comprises determining a probability or amount of write folding for each of the two or more extents
   wherein managing comprises:
      ordering each of the extents based on the amount or probability of write folding for each of the extents; and
      retaining data within cache for a first extent of the extents, wherein the first extent has a high amount or probability of write folding.

2. The computer-executable method of claim 1, wherein the cache de-staging policy is targeted towards a flash data storage array.

3. The computer-executable method of claim 1, wherein the cache de-staging policy is targeted towards a rotational disk based data storage array.

4. The computer-executable method of claim 1, wherein the analyzing comprises determining a probability for each of the extents, wherein the probability is a probability that data is sequentially written to the extent.

5. The computer-executable method of claim 4, wherein managing comprises:
   ordering each of the extents based on the probability of sequentially for each of the extents;
   de-staging extent with high probability for sequential IO when there is a large enough sequential portion of data.

6. A system, comprising:
   a data storage system, wherein the data storage system is enabled to provide a Logical Unit (LU); and
   computer-executable program logic encoded in memory of one or more computers enabled to manage cache de-staging on the data storage system, wherein the computer-executable program logic is configured for the execution of:
      dividing, by the data storage system, the LU into two or more extents;
      at the data storage system, analyzing each of the two or more extents;
      creating, via the data storage system, a cache de-staging policy based on the analysis; and
      managing, at the data storage system, cache de-staging of the LU based the cache de-staging policy;
      wherein the analyzing comprises determining a probability or amount of write folding for each of the two or more extents
      wherein managing comprises:
         ordering each of the extents based on the amount or probability of write folding for each of the extents; and
         retaining data within cache for a first extent of the extents, wherein the first extent has a high amount or probability of write folding.

7. The System of claim 6, wherein the cache de-staging policy is targeted towards a flash data storage array.

8. The System of claim 6, wherein the cache de-staging policy is targeted towards a rotational disk based data storage array.

9. The System of claim 6, wherein the analyzing comprises determining a probability for each of the extents, wherein the probability is a probability that data is sequentially written to the extent.

10. The System of claim 9, wherein managing comprises:
    ordering each of the extents based on the probability of sequentially for each of the extents;
    de-staging extent with high probability for sequential IO when there is a large enough sequential portion of data.

11. A Computer program product for managing cache de-staging on a data storage system wherein the data storage system provides a Logical Unit (LU), the computer-executable method comprising:
    a non-transitory computer readable medium encoded with computer-executable code, the code configured to enable the execution of:
       dividing, by the data storage system, the LU into two or more extents;
       at the data storage system, analyzing each of the two or more extents;
       creating, via the data storage system, a cache de-staging policy based on the analysis; and
       managing, at the data storage system, cache de-staging of the LU based the cache de-staging policy;
       wherein the analyzing comprises determining a probability or amount of write folding for each of the two or more extents
       wherein managing comprises:

ordering each of the extents based on the amount or probability of write folding for each of the extents; and retaining data within cache for a first extent of the extents, wherein the first extent has a high amount or probability of write folding.

12. The Computer program product of claim 11, wherein the cache de-staging policy is targeted towards a flash data storage array.

13. The Computer program product of claim 11, wherein the cache de-staging policy is targeted towards a rotational disk based data storage array.

14. The Computer program product of claim 11, wherein the analyzing comprises determining a probability for each of the extents, wherein the probability is a probability that data is sequentially written to the extent.

\* \* \* \* \*